US006836724B2

(12) United States Patent
Becker et al.

(10) Patent No.: US 6,836,724 B2
(45) Date of Patent: Dec. 28, 2004

(54) NAVIGATION SYSTEM WITH SIGN ASSISTANCE

(75) Inventors: Lisa M. Becker, Lombard, IL (US); Lawrence M. Kaplan, Northbrook, IL (US); Roy Casino, Mundelein, IL (US); Robert Fernekes, McHenry, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 10/700,072

(22) Filed: Nov. 3, 2003

(65) Prior Publication Data

US 2004/0098191 A1 May 20, 2004

Related U.S. Application Data

(63) Continuation of application No. 09/563,132, filed on May 2, 2000, now Pat. No. 6,671,615.

(51) Int. Cl.[7] .................. G08G 1/123; G06F 17/30; G01C 21/00
(52) U.S. Cl. .................. 701/200; 701/210; 340/988
(58) Field of Search .................. 701/200, 210, 701/211, 208, 209, 202, 207; 707/3, 4, 100, 102; 340/995.27, 988, 990, 991, 995.11; 342/451, 457, 458

(56) References Cited

U.S. PATENT DOCUMENTS

| 5,184,123 A | * | 2/1993 | Bremer et al. ......... 340/995.27 |
| 5,214,793 A | | 5/1993 | Conway et al. ............. 455/500 |
| 5,293,163 A | * | 3/1994 | Kakihara et al. ...... 340/995.13 |
| 5,452,212 A | | 9/1995 | Yokoyama et al. ......... 701/211 |
| 5,739,772 A | | 4/1998 | Nanba et al. ............... 340/990 |
| 5,808,566 A | | 9/1998 | Behr et al. .................. 340/995 |
| 5,835,854 A | | 11/1998 | Palisson et al. .......... 455/186.1 |
| 5,844,505 A | | 12/1998 | Van Ryzin .................. 340/988 |
| 5,925,090 A | | 7/1999 | Poonsaengsathit .......... 701/211 |
| 5,974,357 A | | 10/1999 | Poonsaengsathit et al. . 701/210 |
| 6,104,316 A | | 8/2000 | Behr et al. .................. 340/995 |
| 6,107,944 A | | 8/2000 | Behr et al. .................. 340/995 |
| 6,115,669 A | | 9/2000 | Watanabe et al. ........... 701/209 |
| 6,122,593 A | | 9/2000 | Friederich et al. .......... 701/202 |
| 6,128,571 A | | 10/2000 | Ito et al. ..................... 701/201 |
| 6,148,090 A | * | 11/2000 | Narioka ...................... 382/113 |
| 6,182,010 B1 | | 1/2001 | Berstis ....................... 701/211 |
| 6,184,823 B1 | | 2/2001 | Smith et al. ............ 342/357.13 |
| 6,240,361 B1 | | 5/2001 | Ise et al. ..................... 701/208 |
| 6,336,111 B1 | * | 1/2002 | Ashby et al. .................. 707/4 |
| 6,421,659 B1 | * | 7/2002 | Nomura ......................... 707/3 |
| 6,560,529 B1 | * | 5/2003 | Janssen ....................... 701/200 |

* cited by examiner

Primary Examiner—Tan Q. Nguyen
Assistant Examiner—Dalena Tran
(74) Attorney, Agent, or Firm—Jon D. Shutter; Frank J. Kozak; Lawrence M. Kaplan

(57) ABSTRACT

A feature provided by a navigation system or other device whereby additional information about roadside signs can be provided to a driver of a vehicle while traveling along a road. The additional information may be provided automatically or in response to a request from the driver. The additional information may include a translation of the sign text into a selected language, supplementary information about the subject matter of the sign, commercial information about the subject matter of the sign, or other kinds of information. In one embodiment, the additional information is contained in a database that includes data identifying locations of roadside signs and additional information about the roadside signs. Programming in the navigation system or other device determines the location of the vehicle, uses the database to identify one or more roadside signs close to the location of the vehicle, and provides the driver with the additional information about the one or more roadside signs via a user interface.

19 Claims, 8 Drawing Sheets

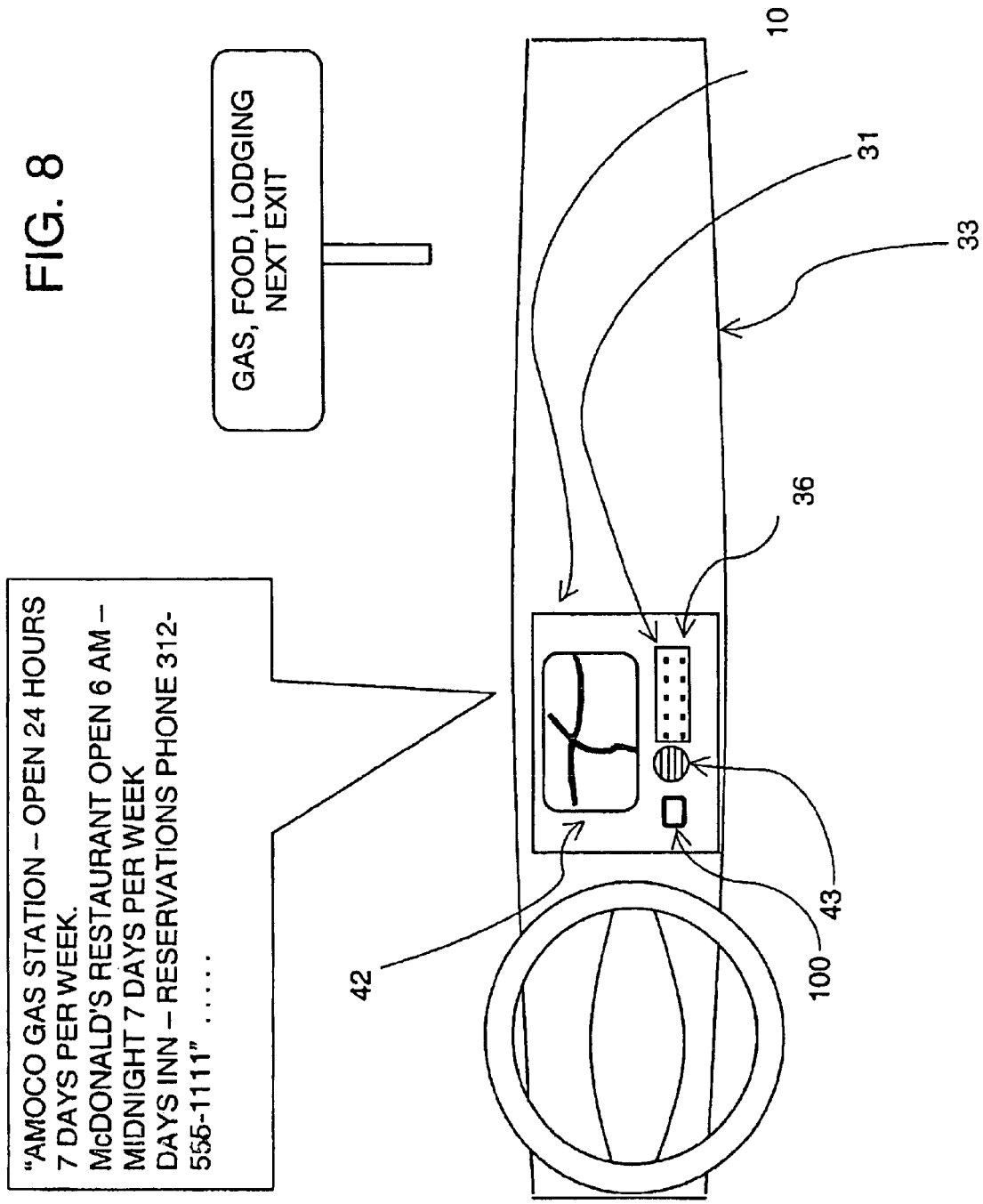

NAVIGATION SYSTEM WITH SIGN ASSISTANCE

The present application is a continuation of Ser. No. 09/563,132 filed May 2, 2000, now U.S. Pat. No. 6,671,615, the entire disclosure of which is incorporated herein by reference.

BACKGROUND OF THE INVENTION

The present invention relates to a feature provided by a navigation system or other device whereby additional information about roadside signs can be provided to a driver of a vehicle while traveling along a road.

Navigation systems are available that provide end users (such as drivers and passengers of the vehicles in which the navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various potential routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for new features and improvements. One area in which there is room for improvement relates to providing assistance with respect to roadside signs. Regardless of whether a vehicle driver is receiving route guidance from a navigation system, the vehicle driver should be paying attention to roadside signs and other traffic-related conditions outside the vehicle. Occasionally, a vehicle driver may desire more information about a sign that he/she has observed while driving. There are various reasons why this may occur. One reason is that the vehicle driver's view of the sign may be obstructed, e.g., by another vehicle such as a truck. Another reason is that the vehicle driver may not be fluent in the language of the text of the roadside sign. Still another reason is that the vehicle driver is interested in the subject matter to which the sign relates and desires more information. Another reason may be that the driver is drowsy or distracted. Yet another reason may be that the driver is unfamiliar with a symbol on the sign.

Accordingly, there is a need for a feature in a navigation system that provides additional information about roadside signs.

SUMMARY OF THE INVENTION

To address these and other objectives, the present invention comprises a feature provided by a navigation system or other device whereby additional information about roadside signs can be provided to a driver of a vehicle while traveling along a road. The additional information may be provided automatically or in response to a request from the driver. The additional information may include a translation of the sign text into a selected language, supplementary information about the subject matter of the sign, commercial information about the subject matter of the sign, or other kinds of information. In one embodiment, the additional information is contained in a database that includes data identifying locations of roadside signs and additional information about the roadside signs. Programming in the navigation system or other device determines the location of the vehicle, uses the database to identify one or more roadside signs close to the location of the vehicle, and provides the driver with the additional information about the one or more roadside signs via a user interface.

BRIEF DESCRIPTION OF THE DRAWINGS

FIG. 8 is an illustration similar to FIG. 2 and shows operation of a fourth embodiment.

DETAILED DESCRIPTION OF THE PRESENTLY PREFERRED EMBODIMENTS

I. Overview of Navigation System

Figure 1:
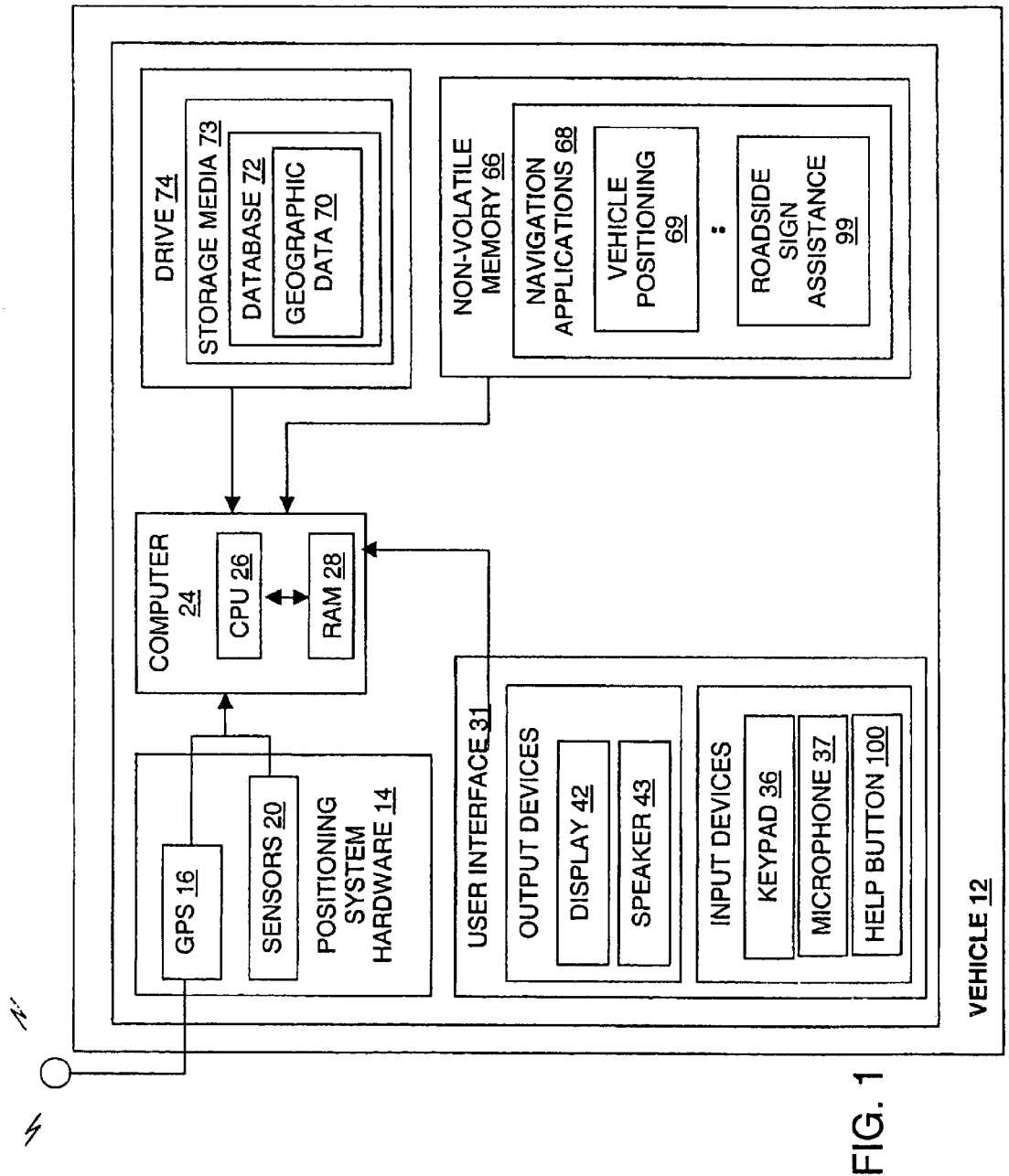
FIG. 1 is a block diagram showing components of a navigation system that provides additional information about roadside signs.

Referring to FIG. 1, there is a diagram illustrating an exemplary configuration of a navigation system 10. The navigation system 10 is a combination of hardware and software components. In one embodiment, the navigation system 10 is located in a vehicle 12, such as an automobile. The navigation system 10 includes appropriate positioning system hardware 14, which in an exemplary embodiment may include a GPS system 16 and other sensor equipment 20 that senses the vehicle speed, heading, acceleration, etc. In addition, the navigation system 10 includes an appropriate computer 24, including a CPU 26 and memory 28 as well as other appropriate hardware.

Also included as part of the navigation system 10 is a user interface 31. The user interface 31 is coupled to the computer 24. The user interface 31 includes appropriate means for receiving instructions and input from a user as well as means for providing information back to the user. To provide these functions, the user interface 31 includes an input keypad 36 and possibly other input hardware and software, such as a microphone 37, voice recognition technology, and so on, through which the driver (or passenger) can request navigation information and services. The user interface 31 may also include output hardware and software, such as a display screen 42, speakers 43, speech synthesis technology, etc., through which the driver or passengers can be provided with information from the navigation system 10.

All of the components described thus far may be conventional (or other than conventional) and the manufacture and use of these components are known to those of skill in the art. For example, the processor 26 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

Figure 2:
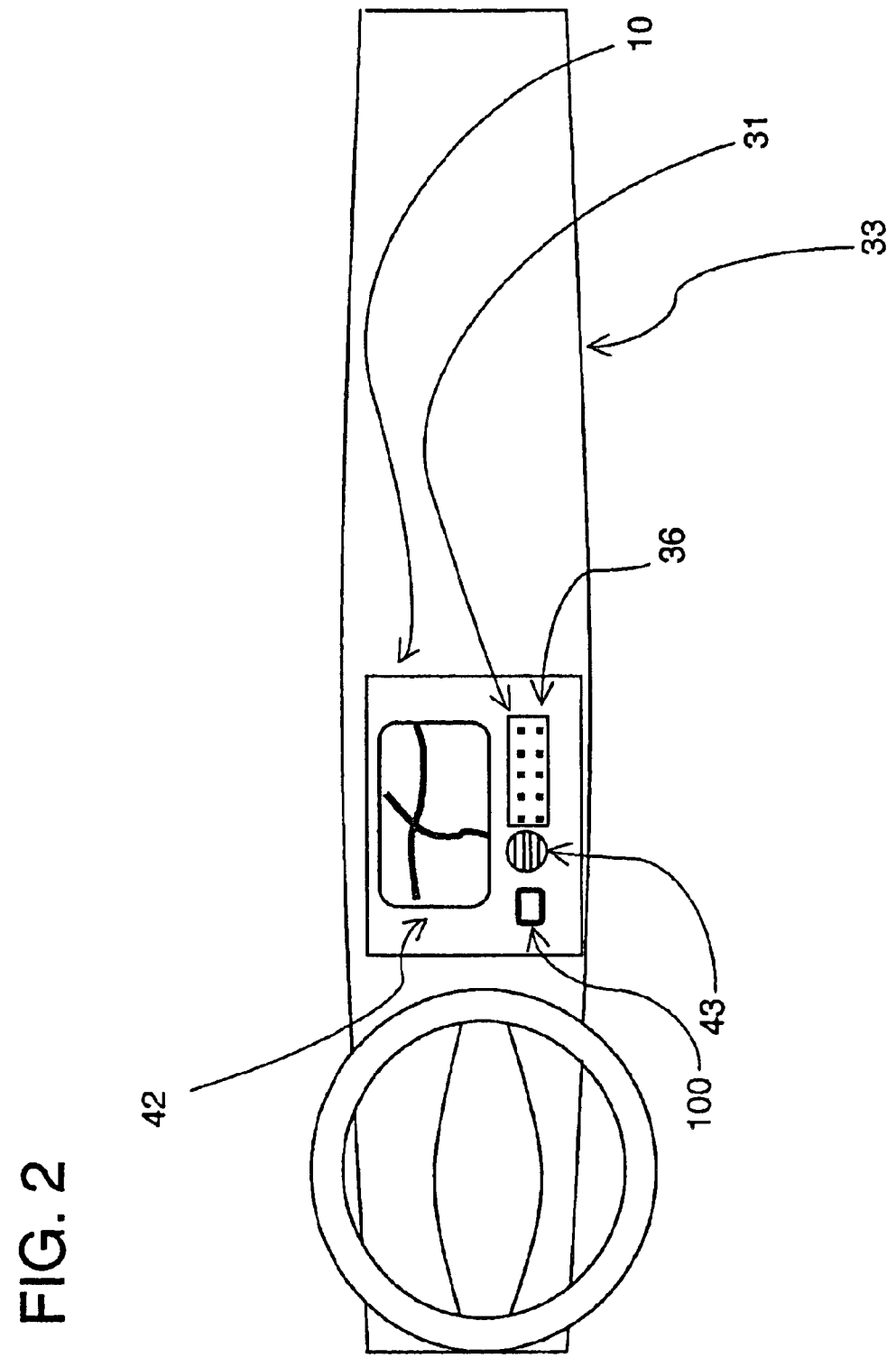
FIG. 2 is an illustration of the navigation system of FIG. 1 installed in a dashboard.

FIG. 2 shows components of the user interface 31. In FIG. 2, the navigation system 10 is installed in a dashboard 33 of the vehicle 12. The components of the user interface 31, including the display 42, speaker 43, and keypad 36, are shown installed in a front panel of the navigation system 10.

II. Navigation Programming

Referring to FIG. 1, the navigation system 10 includes navigation programming 68. The navigation programming 68 may include separate applications (or subprograms) that provide various navigation-related feature's of the navigation system 10. Included among these applications is a vehicle positioning application 69 that receives inputs from the positioning system hardware 14 and that provides an output that indicates the vehicle position. Additional applications may be included for route calculation, route guidance (wherein detailed directions are provided for reaching a desired destination), and map display. Other applications may also be included. The navigation applications may be written in a suitable computer programming language such as C, C++, Java, Visual Basic, etc.

The navigation programming 68 may be stored on a storage device 66 (or ROM). During a typical use of the navigation system 10 of FIG. 1, some or all the applications included in the navigation programming 68 are loaded from the ROM 66 into the memory 28 associated with the processor 26. The computer 24 receives input from the user interface 31. The input may include a request for navigation-related information. Information is obtained from the positioning system hardware 14 indicating a position of the vehicle 12. The information from the positioning system hardware 14 may be used by the navigation programming 68 that is run on the processor 26 to determine the location, direction, speed, etc., of the navigation system 10, and hence the vehicle. The features provided by these navigation applications are provided to the user (e.g., the vehicle driver) by means of the user interface 31.

III. The Geographic Database

In order to provide navigation features to an end user, the navigation programming 68 uses geographic data 70. The geographic data 70 includes information about one or more geographic regions or coverage areas. The geographic data 70 may be stored in the vehicle 12 or alternatively, the geographic data 70 may be stored remotely and made available to the navigation programming 68 in the vehicle 12 through a wireless communication system which may be part of the navigation system 10. In another alternative, a portion of the geographic data 70 may be stored in the vehicle 12 and a portion of the geographic data 70 may be stored in a remote location and made available to the navigation programming 68 in the vehicle 12 over a wireless communication system from the remote location.

In the embodiment shown in FIG. 1, some or all of the geographic data 70 are stored on a medium 73 which is located in the vehicle 12. Accordingly, the navigation system 10 includes a drive 74 (or other suitable peripheral device) into which the medium 73 can be installed and accessed. In one embodiment, the storage medium 73 may be removable and replaceable so that a storage medium with an appropriate data for the geographic region in which the vehicle is traveling can be used. In addition, the storage medium 73 may be replaceable so that data on it can be updated easily. In one embodiment, the storage medium 73 is a CD-ROM disk. In another alternative embodiment, the storage medium 73 may be a PCMCIA card in which case the drive 74 would be substituted with a PCMCIA slot. Various other storage media may be used, including fixed or hard disks, DVD disks or other currently available storage media, as well as storage media that may be developed in the future. (Alternatively, the geographic data 70 and the navigation programming 68 may be provided on the same storage device or medium.)

In one embodiment, the geographic data are provided by Navigation Technologies Corporation of Rosemont, Ill. However, it is understood that the inventive concepts disclosed herein are not restricted to any particular source of data.

Because a navigation system uses data in certain known and expected ways to perform known functions, the geographic data 70 can be organized, structured, and/or arranged in ways that facilitate their use by the navigation system. Some of the ways that geographic data 70 can be can be organized, structured, or arranged are described in U.S. Pat. Nos. 5,968,109, 5,974,419, and 5,953,722, the entire disclosures of which are incorporated by reference herein.

According to one embodiment, the geographic data 70 used by the navigation system may be organized into one or more databases 72. Various arrangements can be used for the one or more geographic database 72. For example, the geographic data 70 in the one or more databases 72 may be organized into separate subsets of data. These subsets may include routing data (used for calculation of routes to desired destinations), cartographic data (used for map display), maneuver data (used for route guidance), point-of-interest data (for identifying specific points of interest, such as hotels, restaurants, museums, stadiums, airports, etc.), name data (identifying the names of roads, places and other features), places (e.g., cities, states, counties), and postal codes. The geographic data 70 may be defined with different data types or with fewer or more data types.

Each subset of the geographic data 70 includes the data and associated attributes required to perform a particular navigation function but excludes data and attributes which are not needed to perform the function. There is some overlap of data between each of these subsets, with the result that some information may be included in more than one subset. For example, a data entity representing a road segment in the routing data and a data entity representing the same road segment in the cartographic data may include attributes identifying the nodes located at the ends of the road segment. Although this duplication may result in a larger overall data storage requirement, each of the navigation functions benefits from the resultant efficiency of handling smaller amounts of data. To permit these types of data to work together, indexes are included as part of the geographic database. The indexes provide cross references, search trees, and/or other data finding techniques.

Figure 3:
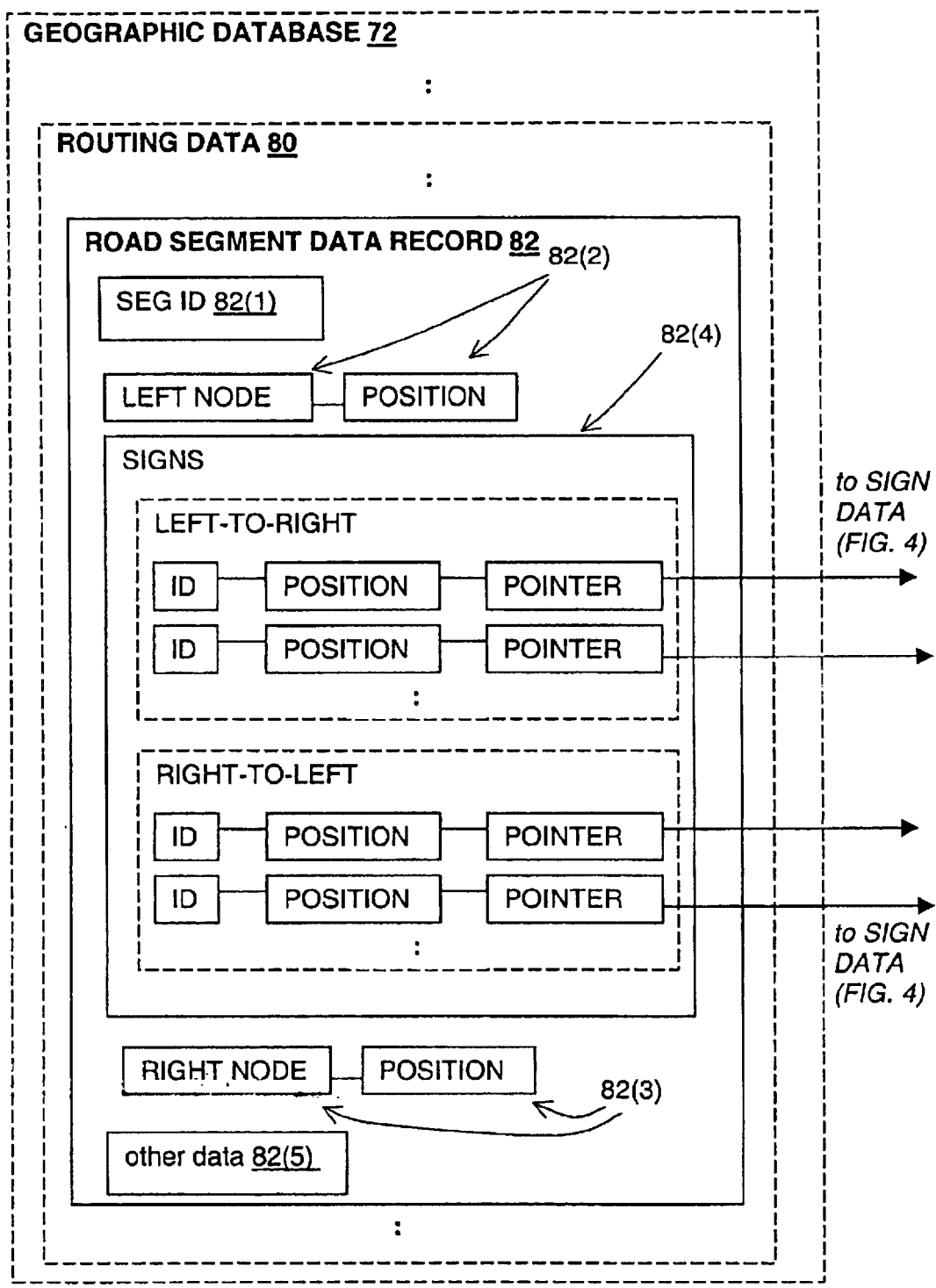
FIG. 3 is a block diagram showing components of the road segment data included in the geographic database of FIG. 1.

FIG. 3 shows some of the components of the routing data subset 80 of the geographic database 72. The routing data subset 80 includes a plurality of road segment data records 82 each of which includes data about a separate road segment located in the coverage area of the geographic database 72. A road segment record 82 includes a segment ID 82(1) by which the data record can be identified in the geographic database 72. The road segment data record 82 includes data 82(2) and 82(3) that indicate the locations of the endpoints (also referred to as "nodes") of the road segment. The locations of the endpoints may be specified in either absolute or relative coordinates. In this embodiment, the road segment record 82 includes data 82(4) relating to the roadside signs located along the represented road segment. The data 82(4) include an entry for each roadside sign that is located along the represented road segment. Each entry in the roadside sign data 82(4) includes an ID by which the represented roadside sign may be identified. Each entry in the roadside sign data 82(4) also includes data indicating a position of the represented roadside sign. The position data may be expressed as an absolute or a relative position. In this embodiment, each entry in the roadside sign data 82(4) includes a pointer. The pointer refers to an entry in a collection of sign information data 90. The collection of sign information data 90 may be a separate subset of the geographic data 70 or alternatively, the sign information data 90 may be included as a part of one of the other subsets of data included in the geographic database 72.

In FIG. 3, the sign data 82(4) includes two groups of entries. One group of entries represents the roadside signs along the represented road segment that are observable when traveling along the road segment from the right node to the left node and the other group of entries represents the roadside signs along the represented road segment that are observable when traveling along the road segment from the left node to the right node.

The road segment record 82 may also include or be associated with other data 82(5) that refer to various other attributes of the represented road segment. For example, the road segment data record may include data identifying what turn restrictions exist at each of the nodes which correspond to intersections at the ends of the road portion represented by the road segment, the name or names by which the represented road segment is known, the street address ranges along the represented road segment, and so on. The various attributes associated with a road segment may be included in a single road segment record, or preferably are included in more than one type of record which are cross-referenced to each other.

Figure 4:
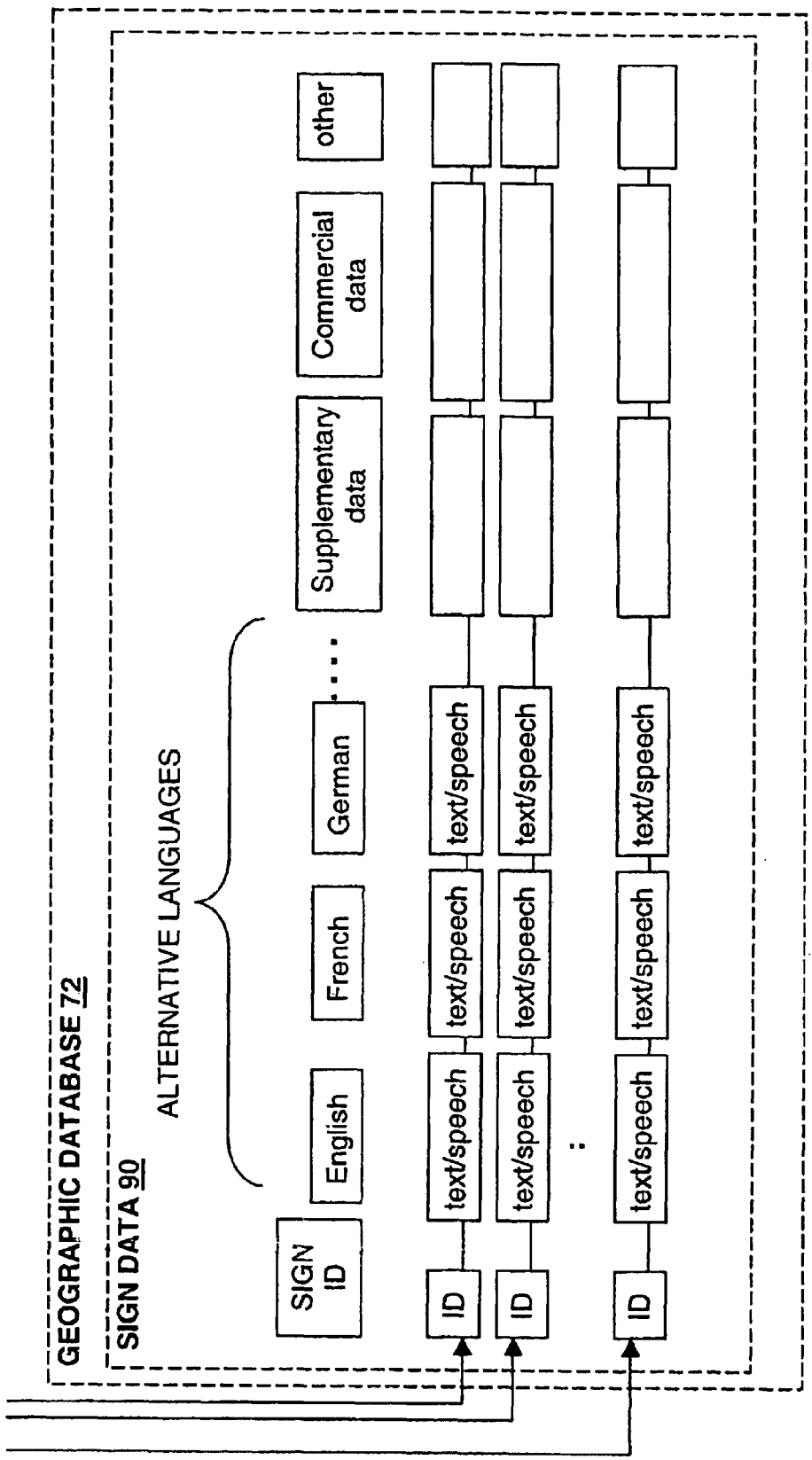
FIG. 4 is a block diagram showing components of the road sign data included in the geographic database of FIG. 1.

FIG. 4 shows some of the components of the sign information data 90. The sign information data 90 includes a plurality of entries. In one embodiment, each entry in the sign information data 90 is associated with a separate type of sign. For example, one entry may be associated with a "stop sign", another entry may be associated with a "yield sign", another entry may be associated with a "railroad crossing sign" and so on. (According to an alternative embodiment, each entry is associated with a separate roadside sign.)

Associated with each entry in the sign information data 90 is an ID. The ID is a unique identifier by which the sign type may be identified. Also associated with each entry in the sign data 90 are data indicating the sign meaning in alternative languages. For example, the data indicating the sign meaning may be provided in English, French, German, Spanish, Japanese, etc. These data indicating the sign meaning may be provided as text, which can be displayed on the display (42 of FIGS. 1 and 2) or alternatively, the data indicating the sign meaning may be provided as audio data that can be played over the speaker (42 of FIG. 1). In one embodiment, both text and audio data are provided. (According to another alternative, the data indicating the sign meaning may be stored as a text file and provided audibly using text-to-speech synthesis technology in a manner known to those of skill in the art.)

In the embodiment of FIG. 4, each entry in the sign data 90 may also include supplementary data, commercial data, and possibly other data. Each of these types of data is explained in more detail below.

IV. Sign Help Feature

As disclosed in more detail herein, a feature is provided by the navigation system by which a user of the navigation system can obtain information about roadside signs. This feature is provided by a roadside sign assistance application 99, shown in FIG. 1. The roadside sign assistance application 99 is included among the navigation applications 68 of the navigation system 10 shown in FIG. 1. When the roadside sign assistance 1 feature is invoked, the roadside sign assistance routine 99 accesses data from the database 72 about one or more roadside signs located in the vicinity of the current vehicle position and provides the information to the user.

Referring again to FIG. 2, the user of the navigation system 10 can invoke the roadside sign information feature by appropriate operation of the user interface 31 of the navigation system 10. In one embodiment, a sign help button 100 is provided on the front panel of the navigation system 10. The sign help button 100 is located so that it is easily accessible to the navigation system user. Pressing the sign help button 100 begins operation of the roadside sign assistance application 99 in the navigation programming 68.

According to an alternative embodiment, the sign help feature may be activated by inputting a code into the input keypad 36. According to still another alternative embodiment, the sign help feature may be activated by selecting the feature from a selection menu provided on the display screen 42. In yet another alternative, the sign help feature may be invoked by a voice command.

When the sign help feature is activated, the roadside sign assistance routine 99 uses the geographic data 70 to determine which signs are located in the vicinity of the vehicle. To perform this function, the roadside sign assistance routine 99 may obtain data indicating the vehicle position from the vehicle positioning application 69, which is included in the navigation applications 68 of FIG. 1. According to this one embodiment, the vehicle positioning application 69 provides an output in the form of a series of data structures, each of which represents the current vehicle position at an instant of time. The vehicle position defined by the vehicle positioning application 69 identifies the road segment upon which the vehicle is located, the position of the vehicle along the identified road segment, and the direction along the identified road segment that the vehicle is heading.

Using the vehicle position obtained from the vehicle positioning application 69, the roadside sign assistance routine 99 identifies the one or more signs located in the vicinity of the vehicle. The roadside sign assistance routine 99 may perform this function using the sign data 82(4) included in the road segment data record 82 that identifies the positions of the roadside signs that are located along the road segment upon which the vehicle is located. Upon identifying the roadside signs in the vicinity of the current vehicle position using the entries in the sign data 82(4) in the road segment data record 82, the additional information relating to these identified signs is obtained from the sign information data 90 using the pointers included in the entries in the sign data 82(4). The appropriate information from the sign information data 90 is then provided to the user via the user interface 31. Embodiments showing the different kinds of information that can be provided to the user are described below.

Embodiment 1

Figure 5:
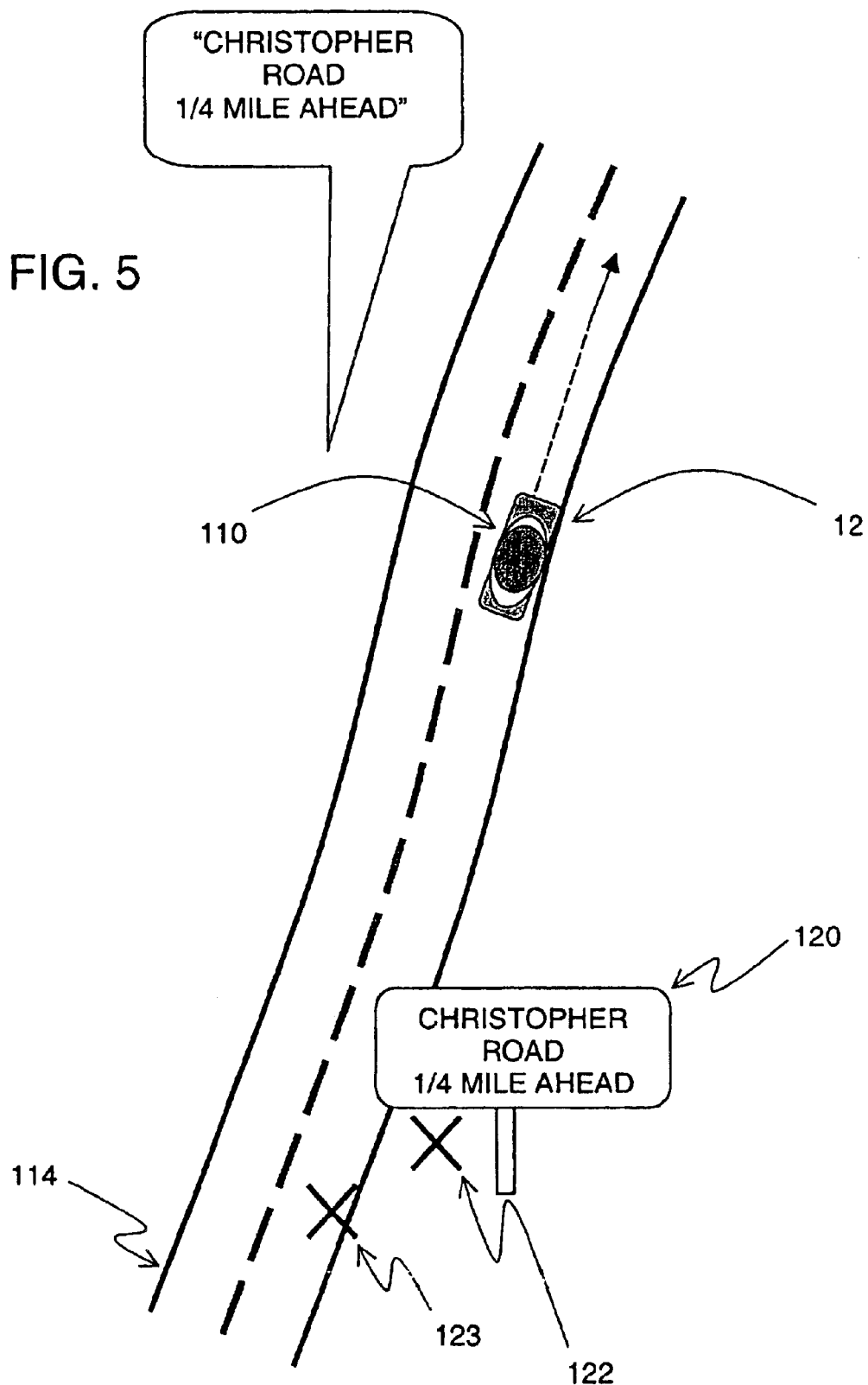
FIG. 5 illustrates operation of a first embodiment whereby roadside sign information is provided by the navigation system of FIG. 1 after the vehicle in which the navigation system is installed has passed a roadside sign while traveling along a road.

Referring to FIG. 5, the vehicle 12 is shown traveling along a road 114. The vehicle 12 is at a position 110 along the road 114. The vehicle 12 has passed a roadside sign 120 that is located at a position 122 along the road 114. For any of various reasons, the driver of the vehicle 12, when the vehicle 12 is at the position 110, desires to know what information is contained on the sign 120. For example, the driver's view of the sign 120 may have been obstructed as the vehicle was at a position 123 approaching the sign. Alternatively, the sign 120 may have been obscured by rain, fog or snow.

When the vehicle 12 is at the location 110, the driver invokes the roadside sign help feature. According to one embodiment described above, the driver may invoke the feature by pressing the help button (100 in FIG. 2) or by other appropriate operation of the user interface 31. When the roadside sign assistance feature is invoked, the roadside sign assistance routine 99 obtains the vehicle's current position (from the vehicle positioning application 69) and finds the data associated with the sign in the vicinity of the current vehicle position (using the sign data 82(4) in the routing data 80 and the sign text data in the sign information data 90). The roadside sign assistance routine 99 then provides the sign information to the user via the user interface 31. The information may be provided audibly using the speaker 43 or visually on the display 42. In the embodiment of FIG. 5, the sign 120 that the vehicle 12 has passed states "CHRISTOPHER ROAD ¼ MILE AHEAD." Using the roadside sign assistance feature, the navigation system 10 provides this same information to the vehicle driver after the vehicle driver has passed the sign.

(Note that if there is more than one sign in the vicinity of the vehicle, information about the closest sign may be displayed first. The user is provided with a means through the user interface to display information about the other signs, e.g., by scrolling back and forth.)

Embodiment 2

Figure 6:
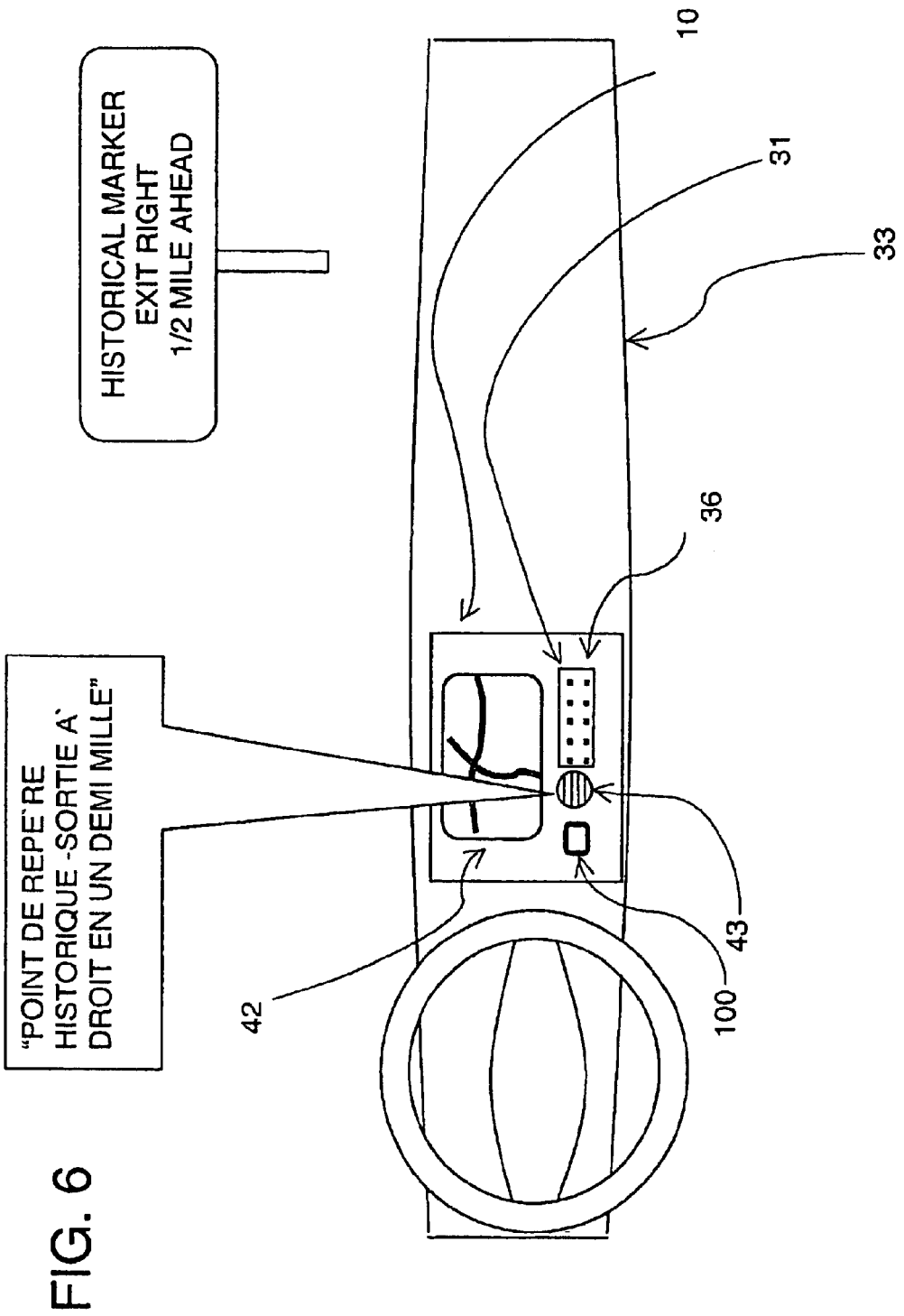
FIG. 6 is an illustration similar to FIG. 2 and shows operation of a second embodiment.

FIG. 6 shows another embodiment of the roadside sign assistance feature. FIG. 6 shows the dashboard 33 of the vehicle 12 with the navigation system 10 installed therein. Observable by the vehicle driver through the windshield of the vehicle 12 is a sign having the text "HISTORICAL MARKER EXIT RIGHT ½ MILE AHEAD." In this example, the driver is French-speaking and would desire information about the roadside sign in French. According to this alternative embodiment, the driver configures the navigation system 10 to provide guidance in French, e.g., by using an appropriate configuration menu. Then, while driving, the driver invokes the roadside sign assistance feature (e.g., by pressing the help button 100 or by other appropriate operation of the user interface 31). As in the previous embodiment, when the roadside sign assistance application 99 is invoked, the sign(s) in the vicinity of the vehicle are identified using the data indicating the current vehicle position (from the vehicle positioning application 69) and the data 82(4) indicating the positions of roadside signs from the geographic database 72. Using the pointer(s) in the data 82(4), the additional data relating to the identified roadside signs are obtained from the sign information data 90. Then, the roadside sign assistance routine 99 provides the driver with information about the sign(s) in the vicinity of the current position of the vehicle. In this embodiment, because the driver has configured the navigation system to provide guidance in French, the roadside sign application 99 selects the French language data from the sign information data 90 and provides this information to the user. Thus, the navigation system 10 provides the driver with a translation of the sign that the driver is observing through the windshield.

Embodiment 3

Figure 7:
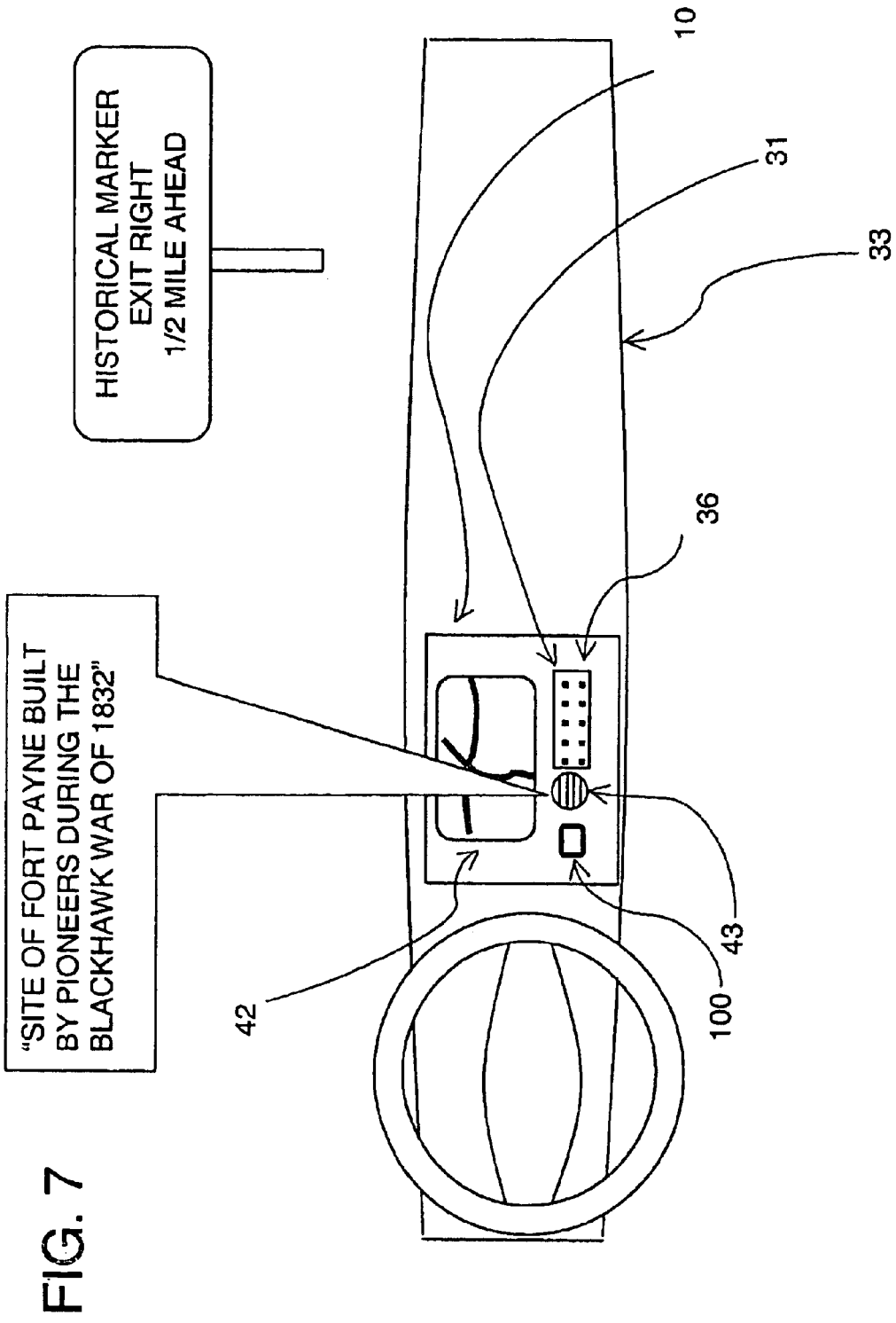
FIG. 7 is an illustration similar to FIG. 2 and shows operation of a third embodiment.

FIG. 7 shows another embodiment of the roadside sign assistance feature. FIG. 7 shows the dashboard 33 of the vehicle 12 with the navigation system 10 installed therein. Observable by the vehicle driver through the windshield of the vehicle 12 is a sign having the text "HISTORICAL MARKER EXIT RIGHT ½ MILE AHEAD." In this example, the driver desires to know additional information about the subject matter of the roadside sign. According to this alternative embodiment, the driver invokes the roadside sign assistance feature, e.g., by other appropriate operation of the user interface 31. When the roadside sign assistance application 99 is invoked, the sign(s) in the vicinity of the vehicle are identified using the data indicating the current vehicle position (from the vehicle positioning application 69) and the data 82(4) indicating the positions of roadside signs from the geographic database 72. Using the pointer(s) in the data 82(4), the additional data relating to the identified roadside signs are obtained from the sign information data 90. Then, the roadside sign assistance routine 99 provides the driver with supplementary data about the sign(s) in the vicinity of the current position of the vehicle. In this embodiment, because the driver has requested supplementary information about roadside sign(s), the roadside sign application 99 selects the supplementary data associated with the sign(s) from the sign information data 90 and provides this supplementary information to the user. In this example, the supplementary information may include historical facts about the historical marker referenced on the roadside sign. Thus, the navigation system 10 provides the driver with supplementary information about signs in which the driver is interested that the driver is observing through the windshield.

Embodiment 4

FIG. 8 shows another embodiment of the roadside sign assistance feature. FIG. 8 shows the dashboard 33 of the vehicle 12 with the navigation system 10 installed therein. Observable by the vehicle driver through the windshield of the vehicle 12 is a sign having the text "GAS, FOOD, LODGING, NEXT EXIT." In this example, the driver desires to know additional commercial information about the subject matter of the roadside sign. According to this alternative embodiment, the driver invokes the roadside sign assistance feature, e.g., by other appropriate operation of the user interface 31. When the driver invokes the roadside sign assistance feature, the driver indicates that additional commercial information about the roadside sign is desired. When the roadside sign assistance application 99 is invoked, the sign(s) in the vicinity of the vehicle are identified using the data indicating the current vehicle position (from the vehicle positioning application 69) and the data 82(4) indicating the positions of roadside signs from the geographic database 72. Using the pointer(s) in the data 82(4), the additional commercial data relating to the identified roadside signs are obtained from the sign information data 90. Then, the roadside sign assistance routine 99 provides the driver with the commercial data about the sign(s) in the vicinity of the current position of the vehicle. In this embodiment, because the driver has requested commercial information about roadside sign(s), the roadside sign application 99 selects the commercial information data associated with the sign(s) from the sign information data 90 and provides this commercial information to the user. In this example, the commercial information may include the identity, hours of operation, telephone number and other information about the facility that is generically referenced on the roadside sign. Thus, the navigation system 10 provides the driver with commercial information about signs that would not otherwise be available to the driver.

Additional Embodiments

In the embodiments described above, the navigation system used a geographic database that included the data indicating the positions of roadside signs and additional information about the roadside signs. In an alternative embodiment, roadside signs can include transmitters that transmit additional information about the subject matter on the signs. The transmitters may be short-range transmitters. Then, the navigation system in the vehicle (or other device carried in the vehicle) can receive the transmissions from the roadside signs and provide the additional information to the driver. In this embodiment, the driver may be provided with the option to select the type of additional information and the language in which the additional information is provided.

In alternative embodiments, the various types of additional data about roadside signs can be provided in various combinations. For example, in some alternative embodiments, the navigation system provides only one additional type of information about roadside signs. As an example, in one alternative embodiment, only the alternative language of the sign text is provided, but not the supplementary data or the commercial data. In another alternative embodiment, only the supplementary data related to the sign text is provided, but not the alternative language data or the commercial data. In another alternative embodiment, the navigation system provides all the above-described additional types of information about roadside signs, including alternative languages, supplementary data, and commercial data.

In alternative embodiments, the supplementary data and the commercial data can also be provided in alternative languages.

When a navigation system provides more than one type of additional information about roadside signs, the user interface of the navigation system provides an appropriate means by which the driver can indicate which of the several different types of additional information about roadside signs is desired. For example, separate buttons may be provided on the navigation system front panel. Alternatively, the various types of additional information that are available, e.g., alternative language, supplementary, commercial, can be presented on a menu on the display (43 in FIG. 1) from which the user can make a selection. In another alternative, combinations of user inputs can be used to select the various types of additional information, e.g., one short press of the help button for sign text and two short presses of the help button for supplementary information.

It may occur that there is more than one sign in the vicinity of the vehicle. When this occurs, the user is presented with an option to scroll back and forth among the plurality of roadside signs in the vehicle vicinity, using the keypad or other input means of the user interface.

In another alternative embodiment, the navigation system can be set in a mode in which the additional information associated with all the roadside signs that are encountered as the vehicle is traveling is automatically presented to the driver. The mode may be used when the driver wants to be sure not to miss a particular sign or when the driver is curious about the facilities along a road. In an alternative version, the navigation system can be set in a mode in which only the supplementary information or the commercial information associated with all the roadside signs is presented.

In another alternative embodiment, the navigation system can be set to filter the additional information about roadside signs that is automatically presented to the user. The filtering process may be based on subject matter, business chain, or any other criteria. For example, according to this alternative, the user can select that only information about national parks be automatically presented. Then, when a sign about national parks is encountered, the navigation system automatically presents the supplementary information or the commercial information to the user. In another example, the user can select a business chain, e.g., Holiday Inn hotels. Then, when a sign referring to a Holiday Inn hotel is encountered, the navigation system automatically presents the supplementary or commercial information to the user.

The disclosed embodiments can be provided in in-vehicle navigation systems. The disclosed embodiments can also be implemented on other platforms, such as personal computers (including portable computers), hand-held navigation systems, personal digital assistants, PalmPilot®-type devices, wireless telephones, as well as other electronic devices.

It is intended that the foregoing detailed description be regarded as illustrative rather than limiting and that it is understood that the following claims including all equivalents are intended to define the scope of the invention.

We claim:

1. A navigation system comprising:

a database that includes data identifying locations of roadside signs and associated information about said roadside signs, wherein said associated information includes at least one of: commercial information, historical information and translation of text of the roadside sign into a language other than the language of the roadside sign;

programming that determines a location of a vehicle;

programming that uses said database to identify at least one roadside sign close to said location of said vehicle; and a user interface that provides to a user of said navigation system said associated information from said database about the at least one roadside sign.

2. The navigation system of claim 1 wherein said user interface further comprises:

a help button accessible to the user by which the user can request the navigation system to provide additional information about roadside signs.

3. The navigation system of claim 1 wherein the roadside sign is a sign that has just been passed by the vehicle.

4. The navigation system of claim 1 wherein the additional information is provided to the user audibly.

5. The navigation system of claim 1 wherein the associated information is provided automatically.

6. The navigation system of claim 1 wherein said associated information provided to the user meets a filter criterion.

7. The navigation system of claim 6 wherein the filtering criterion relates to a subject matter of the roadside sign.

8. A mobile computing platform comprising:
- a help button accessible to a user by which the user can request the computing platform to provide information about at least one sign in a vicinity of a current position of the computing platform;
- programming that accesses a database that includes information about signs and locations of said signs to identify said sign in the vicinity of the computing platform; and
- a user interface that provides the user with the information about said sign in the vicinity of the computing platform.

9. The computing platform of claim 8 wherein the information about the sign includes at least one of: commercial information, historical information and translation of text of the sign into a language other than the language of the sign.

10. The computing platform of claim 8 wherein the information is provided to the user audibly.

11. The computing platform of claim 8 wherein the information is provided to the user on a display.

12. The computing platform of claim 8 wherein the information provided to the user meets a filter criterion.

13. The computing platform of claim 12 wherein the filtering criterion relates to a subject matter of the sign.

14. The computing platform of claim 8 wherein said database is remotely located.

15. A mobile computing platform comprising:
- programming that accesses a database that includes information about signs and locations of said signs to identify at least one sign in a vicinity of a current position of the computing platform; and
- a user interface that provides the user with the information about the sign in the vicinity of the computing platform if a specified filter criterion is satisfied, wherein said filter criterion relates to commercial information.

16. The mobile computing platform of claim 15 wherein said filtering criterion is a business chain.

17. The mobile computing platform of claim 15 wherein said filtering criterion is a user specified preference.

18. The mobile computing platform of claim 15 wherein the information is provided automatically.

19. The mobile computing platform of claim 15 wherein the database is remotely located.

* * * * *